US012762120B2

United States Patent

(12) United States Patent
Chen et al.

(10) Patent No.: US 12,762,120 B2
(45) Date of Patent: Oct. 13, 2026

(54) GENERATION OF DATA FILTERS FROM NATURAL LANGUAGE QUERIES

(71) Applicant: Adobe Inc., San Jose, CA (US)

(72) Inventors: Xiang Chen, Palo Alto, CA (US); Wei Zhang, Great Falls, VA (US); Uttaran Bhattacharya, Sunnyvale, CA (US); Tong Yu, Fremont, CA (US); Sungchul Kim, San Jose, CA (US); Said Kobeissi, Lovettsville, VA (US); Ryan Rossi, Santa Clara, CA (US); Ritwik Sinha, Cupertino, CA (US); Razvan Alexandru Balan, Bucharest (RO); Prithvi Bhutani, Lynnwood, WA (US); Michael Edwin Rimer, Lindon, UT (US); Md Mehrab Tanjim, Santa Clara, CA (US); Jordan Henson Walker, Lehi, UT (US); Iftikhar Ahamath Burhanuddin, Bangalore (IN); Brandon Galen Mooso, South Jordan, UT (US); Atanu Ranjan Sinha, Bangalore (IN); Andrei Zugravu, Bucharest (RO); Abhisek Trivedi, South Jordan, UT (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 18/657,223

(22) Filed: May 7, 2024

(65) Prior Publication Data

US 2025/0335434 A1 Oct. 30, 2025

(51) Int. Cl.
*G06F 16/2452* (2019.01)
*G06F 16/22* (2019.01)

(52) U.S. Cl.
CPC .... *G06F 16/24522* (2019.01); *G06F 16/2255* (2019.01)

(58) Field of Classification Search
None
See application file for complete search history.

(56) References Cited

U.S. PATENT DOCUMENTS 9,652,451 B2 * 5/2017 Elder ...................... G06F 40/35
11,790,018 B1 * 10/2023 Donnell .............. G06F 16/9532 707/797
(Continued)

OTHER PUBLICATIONS

Alohaly et al. "Automated extraction of attributes from natural language attribute-based access control (ABAC) Policies", Cybersecurity (2019) 2:2, https://doi.org/10.1186/s42400-018-0019-2 (Year: 2019).*
(Continued)

*Primary Examiner* — Aleksandr Kerzhner
*Assistant Examiner* — Anugeetha Kunjithapatham
(74) *Attorney, Agent, or Firm* — Shook Hardy & Bacon L.L.P.

(57) ABSTRACT

Some aspects relate to technologies for generating data filters from natural language queries and using the data filters to retrieve data from a structured dataset. In accordance with some aspects, a natural language query is received. A generative model generates an initial filter based on the natural language query, where the initial filter includes an initial attribute name and an initial attribute value. A valid attribute value corresponding to the initial attribute value is identified, where the valid attribute value comprises an attribute value in the structured dataset. Additionally, a valid attribute name corresponding to the initial attribute name is identified, where the valid attribute name comprises an attribute name in the structured dataset. A valid filter is generated using the valid attribute value and the valid attribute name, and data is retrieved from the structured dataset using the valid filter.

20 Claims, 7 Drawing Sheets

(56) References Cited

U.S. PATENT DOCUMENTS

| | | | | |
|---|---|---|---|---|
| 12,217,000 | B1 * | 2/2025 | Setlur | G06F 16/34 |
| 12,271,698 | B1 * | 4/2025 | Wang | G06F 16/24522 |
| 2003/0233224 | A1 * | 12/2003 | Marchisio | G06F 40/211<br>707/E17.084 |
| 2007/0156669 | A1 * | 7/2007 | Marchisio | G06F 16/3344 |
| 2012/0254143 | A1 * | 10/2012 | Varma | G06F 40/30<br>707/706 |
| 2013/0080472 | A1 * | 3/2013 | Cohen | G06F 16/243<br>707/E17.128 |
| 2013/0198219 | A1 * | 8/2013 | Cohen | G06F 16/243<br>707/E17.014 |
| 2014/0379753 | A1 * | 12/2014 | Roit | G06F 16/243<br>707/771 |
| 2015/0324422 | A1 * | 11/2015 | Elder | G06F 40/40<br>707/722 |
| 2023/0297633 | A1 * | 9/2023 | Stewart | G06F 16/953<br>707/709 |
| 2024/0338378 | A1 * | 10/2024 | Setlur | G06F 16/243 |
| 2025/0284888 | A1 * | 9/2025 | Khullar | G06F 40/205 |

OTHER PUBLICATIONS

Bazaga et. al., “Translating synthetic natural language to database queries with a polyglot deep learning framework”, Scientific Reports | (2021) 11:18462 | https://doi.org/10.1038/s41598-021-98019-3 (Year: 2021).*

* cited by examiner

GENERATION OF DATA FILTERS FROM NATURAL LANGUAGE QUERIES

BACKGROUND

Querying structured data using natural language queries involves converting human language input into machine-understandable queries to retrieve relevant information from structured datasets. This conversion process poses various challenges, including ambiguity resolution, understanding complex queries with multiple criteria, handling linguistic variations, and incorporating context to interpret user intent accurately. One particular challenge is the ability to detect whether a filter exists in the natural language query and then generating a valid filter expression that can then be used to retrieve data from the structured dataset and provide an appropriate answer.

SUMMARY

Some aspects of the present technology relate to, among other things, processing natural language queries to identify data filters that are used to retrieve data from a structured dataset and return responses to the natural language queries. In accordance with some aspects, when a natural language query is received, a generative model is used to generate one or more initial filters based on the natural language query. Each initial filter includes an initial attribute name and an initial attribute value and can correspond to a non-numeric attribute (i.e., an attribute having non-numerical values) or a numeric attribute (i.e., an attribute having numerical values). A valid filter that can be used to retrieve data from the structured dataset is generated for each initial filter. In the case of an initial filter for a non-numeric attribute, a valid attribute value corresponding to the initial attribute value and a valid attribute name corresponding to the initial attribute name are identified, and the valid filter is generated using the valid attribute name and the valid attribute value. The valid attribute value is an attribute value that appears in the structured dataset, and the valid attribute name is an attribute name that appears in the structured dataset. In some aspects, the valid attribute value is identified by performing an exact matching operation to determine if the initial attribute value is an exact match to a valid attribute value, and performing a similarity-based matching operation when an exact match is not found. In the case of an initial filter for a numeric attribute, a valid attribute name corresponding to the initial attribute name is identified, and the valid filter is generated using the valid attribute name and the initial attribute value. After generating a valid filter for each initial filter, data is retrieved from the structured dataset using the valid filter(s), and the data is used to generate a response to the natural language query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
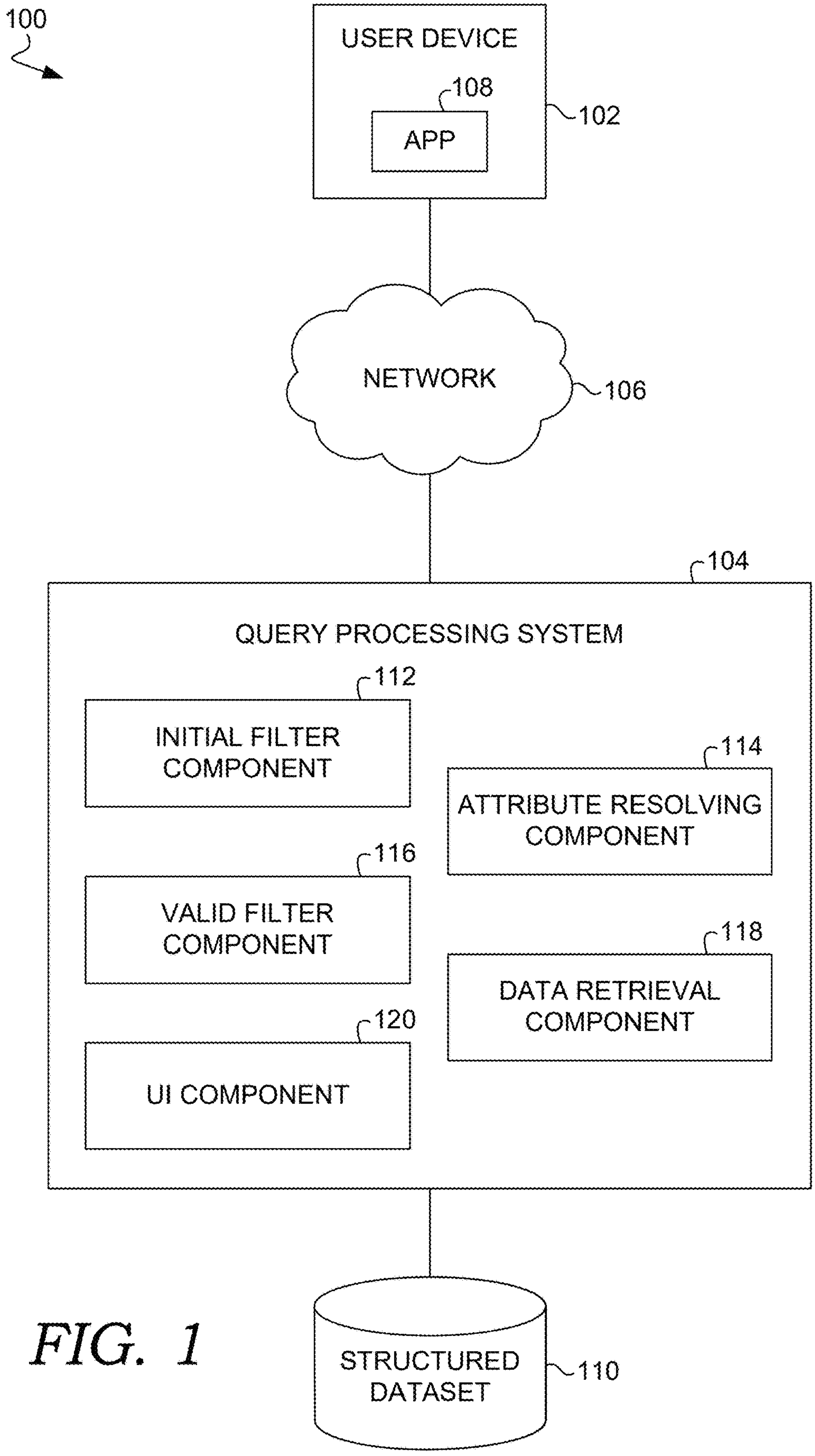
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "structured dataset" is a collection of "structured data," which refers to data that is structured using attributes. In some instances, the structured data comprises tabular data that can be represented as a table in rows and columns, where each row corresponds to a record, and each column corresponds to an attribute.

A "row" or "record" is a collection of information for a single observation, event, entity, or item. A record comprises a dataset that includes information for attributes for the tabular data.

An "attribute" (e.g., a column in tabular data) corresponds to a dimension, characteristic, feature, or property within a schema of a structured dataset. An attribute is identified using an "attribute name" and can comprise either numerical data or non-numerical data.

"Numerical data" comprises data values in the form of numbers, including discrete values (e.g., number of items in a set, or birth year) or continuous values (e.g., temperature). A "numeric attribute" refers to an attribute having numerical data.

"Non-numerical data" comprises data values in the form of names or labels (e.g., country of origin, or operating system). A "non-numeric attribute" refers to an attribute having non-numerical data.

An "attribute value" comprises a data value for a given attribute. In some instances, an attribute value can correspond to a particular data element of a given record in tabular data, such as a data element at the intersection of a record/row and an attribute/column in the tabular data.

As used herein, a "valid attribute name" refers to an attribute name that appears in a structured dataset, and a "valid attribute value" refers to an attribute value that appears in the structured dataset.

A "natural language query" is input provided by a user in everyday language used by humans to communicate, as opposed to using a specialized syntax or commands.

The term "initial filter" is used herein to refer to a filter generated by a generative model based on a natural language query. An initial filter includes an "initial attribute name" and an "initial attribute value."

An "initial attribute name" refers to an attribute name in an initial filter output by a generative model that may not exactly match a valid attribute name that appears in structured data.

An "initial attribute value" refers to an attribute value in an initial filter output by a generative model that may not exactly match a valid attribute value that appears in structured data. In some cases, an initial filter can also include an operator (e.g., equals, greater than, less than, etc.).

A "valid filter" refers to a filter with a valid attribute name and valid attribute value appearing in a structured dataset, such that the valid filter can be executed against the structured dataset.

Overview

Processing natural language queries to generate valid filters that can be executed against structured data is challenging for many reasons. First, it is often difficult to detect whether a phrase in a natural language query corresponds to an actual attribute value. In particular, natural language queries often call out specific attribute values without specifying an attribute name. For instance, in the natural language query "revenue for US", it is difficult for a query processing system to recognize the term "US" as an attribute value and which attribute name it corresponds to. Additionally, in some cases, an attribute value can correspond to a multiple attribute names. Moreover, users often do not know the attribute names in their data, not to mention the actual attribute values. As a result, phrases used in natural language queries from users often do not match actual attribute names and/or actual attribute values in the structured dataset, further exacerbating the problem. In some structured datasets, attributes can have tens of millions or more attribute values, making this an extremely challenging problem. Furthermore, there can also be multiple filters of different types presented a single query. For instance, the natural language query—"Compare revenue for Mobile users that use Chrome in US that have at least five orders"—contains language corresponding to three filters that use different non-numeric attributes, along with a fourth filter that is based on a numeric attribute, such as, for instance: [['device', 'eq', 'Mobile'], ['browser', 'eq', 'Chrome'], ['country', 'eq', 'US'], ['orders', 'ge', '5']].

Aspects of the technology described herein improve the functioning of the computer itself in light of these shortcomings in existing technologies by providing a solution in which a query processing system receives natural language queries and generates valid filters that can be executed against a structured dataset in order to return responses to the natural language queries. In accordance with some aspects, when a natural language query is received, the query processing system causes a generative model to generate one or more initial filters based on the natural language query. This can include generating a prompt based on the natural language query and providing the prompt to the generative model, which outputs the initial filter(s) based on the prompt. Some configurations generate the prompt to including instructions and/or information to facilitate the generation of initial filters, such as a set of example queries paired with example filters, a list of valid attribute names present in the structured dataset, and/or an example filter illustrating the expected output from the generative model.

Each initial filter output by the generative model includes an initial attribute name and an initial attribute value and can also include an operator (e.g., equal, greater than, etc.). An initial filter can correspond to a non-numeric attribute having non-numerical values (e.g., ['country', 'eq', 'US']) or a numeric attribute having numerical values (e.g., ['orders', 'ge', '5']).

The initial attribute name and/or the initial attribute value in an initial filter may not exactly match a valid attribute name and/or valid attribute value present in the structured dataset. As such, the query processing system generates a valid filter by resolving the initial attribute name and/or initial attribute value to a valid attribute value and/or valid attribute name.

In the case of an initial filter for a non-numeric attribute, the query processing system identifies a valid attribute value corresponding to the initial attribute value. In some aspects, this includes performing an exact match operation to determine if there is a valid attribute value that exactly matches the initial attribute value, and performing a similarly-based matching operation when an exact match is not found. The similarity-based matching could include generating an embedding of the initial attribute value and determining a similarity of the embedding for the initial attribute value to embeddings of valid attribute values, and selecting a valid attribute value based on the similarities. The query processing system also identifies a valid attribute name for the initial attribute name. In some aspects, the valid attribute name can be identified based on the valid attribute value—i.e., in instances in which the valid attribute value corresponds to a single valid attribute name. In other instances, the valid attribute name can be identified using one or more matching operations (e.g., exact matching and/or similarity-based matching). After identifying the valid attribute value and valid attribute name, the query processing system generates a valid filter, for instance, by replacing the initial attribute value in the initial filter with the valid attribute name and replacing the initial attribute name in the initial filter with the valid attribute name.

In the case of an initial filter for a numeric attribute, a valid attribute name corresponding to the initial attribute name is identified. In some aspects, the query processing system performs one or more matching operations (e.g., exact matching and/or similarity-based matching) to identifying the valid attribute name. The query processing system then generates a valid filter that include the valid attribute name and the initial attribute value.

After generating a valid filter for each initial filter, the query processing system retrieves data from the structured dataset using the valid filter(s). A response is then generated using the retrieved data, and the response can be provided to the user device that submitted the natural language query.

Aspects of the technology described herein provide a number of improvements over existing technologies. For instance, the technology described herein provides a solution capable of processing natural language queries with noisy and ambiguous user language that does not match valid attribute names and valid attribute values in a structured dataset in order to generate valid filters for non-numeric attributes and numeric attributes. Additionally, the technology described herein is highly scalable as it is able to handle such natural language queries for structured datasets having millions of unique valid attribute values. Configurations employing exact matching followed by similarity-based matching in cases of no exact matches provide for low latency processing. Further, the technology described herein supports any arbitrary operation (e.g., equals, not equal to, greater than, less than, etc.) and can generate any number of filters from a given natural language query.

Example System for Generating Data Filters from Natural Language Queries

With reference now to the drawings, FIG. 1 is a block diagram illustrating an exemplary system 100 that generates data filters from natural language queries and employs the data filters to retrieve data from a structured dataset to return in response to the queries in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a query processing system 104. Each of the user device 102 and the query processing system 104 shown in FIG. 1 can comprise one or more computer devices, such as the computing device 700 of FIG. 7, discussed below. As shown in FIG. 1, the user device 102 and the query processing system 104 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the query processing system 104 could be provided by multiple server devices collectively providing the functionality of the query processing system 104 as described herein. Additionally, other components not shown may also be included within the network environment.

The user device 102 can be a client device on the client-side of operating environment 100, while the query processing system 104 can be on the server-side of operating environment 100. The query processing system 104 can comprise server-side software designed to work in conjunction with client-side software on the user device 102 so as to implement any combination of the features and functionalities discussed in the present disclosure. For instance, the user device 102 can include an application 108 for interacting with the query processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the query processing system 104 remain as separate entities. While the operating environment 100 illustrates a configuration in a networked environment with a separate user device and query processing system, it should be understood that other configurations can be employed in which aspects of the various components are combined. For instance, in some aspects, aspects of the query processing system 104 can be implemented in part or in whole by the user device 102.

The user device 102 may comprise any type of computing device capable of use by a user. For example, in one aspect, a user device may be the type of computing device 700 described in relation to FIG. 7 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the query processing system 104 via the user device 102.

The query processing system 104 processes natural language queries from user devices, such as the user device 102, and returns responses to the queries. In some instances, the natural language queries seek data from a data store 110. The data store 110 can store a structured dataset in a variety of different formats that facilitate retrieval of data for generating responses to the natural language queries. The structured dataset comprises structured data that employs a schema having multiple attributes. For instance, the data can comprise tabular data that can be represented as a table in rows and columns, where each row corresponds to a record, and each column corresponds to an attribute. An attribute (e.g., a column in tabular data) corresponds to a dimension, characteristic, feature, or property within the schema of the structured dataset. An attribute is identified using an attribute name and can comprises attribute values that are either numerical data (i.e., a numeric attribute) or non-numerical data (i.e., a non-numeric attribute). Numerical data comprises data in the form of numbers, including discrete or continuous values. Non-numerical data comprises data in the form of names or labels.

In some configurations, the query processing system is implemented as part of a conversational AI assistant that generates responses to user queries through natural language interaction. In such instances, the query processing system 104 can leverage artificial intelligence and machine learning algorithms to understand user queries, interpret context, and generate responses by accessing relevant information from various sources, including data from the data store 110.

As shown in FIG. 1, the query processing system 104 includes an initial filter component 112, an attribute resolving component 114, a valid filter component 116, a data retrieval component 118, and a user interface component 120. The modules/components of the query processing system 104 may be in addition to other components that provide further additional functions beyond the features described herein. The query processing system 104 can be implemented using one or more server devices, one or more platforms with corresponding application programming interfaces, cloud infrastructure, and the like. While the query processing system 104 is shown separate from the user device 102 in the configuration of FIG. 1, it should be understood that in other configurations, some or all of the functions of the query processing system 104 can be provided on the user device 102. Additionally, in some configurations, one or more of the components of the query processing system 104 shown in FIG. 1 can be provided by the user device 102 and/or another location not shown in FIG. 1. The components can be provided by a single entity or multiple entities.

In some aspects, the functions performed by components of the query processing system 104 are associated with one or more applications, services, or routines. In particular, such applications, services, or routines may operate on one or more user devices, servers, may be distributed across one or more user devices and servers, or be implemented in the cloud. Moreover, in some aspects, these components of the query processing system 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Given a natural language query from a user device, such as the user device 102, the initial filter component 112 employs a generative model to generate one or more initial filters. An initial filter output by the generative model includes an initial attribute name and initial attribute value. In some configurations, an initial filter also includes an operator (e.g., equals, less than, greater than, etc.). A initial filter generated by the generative model can be noisy as the initial attribute name may not exactly match a valid attribute name found in the structured data and/or the initial attribute value may not exactly match a valid attribute value found in the structured data.

Figure 2:
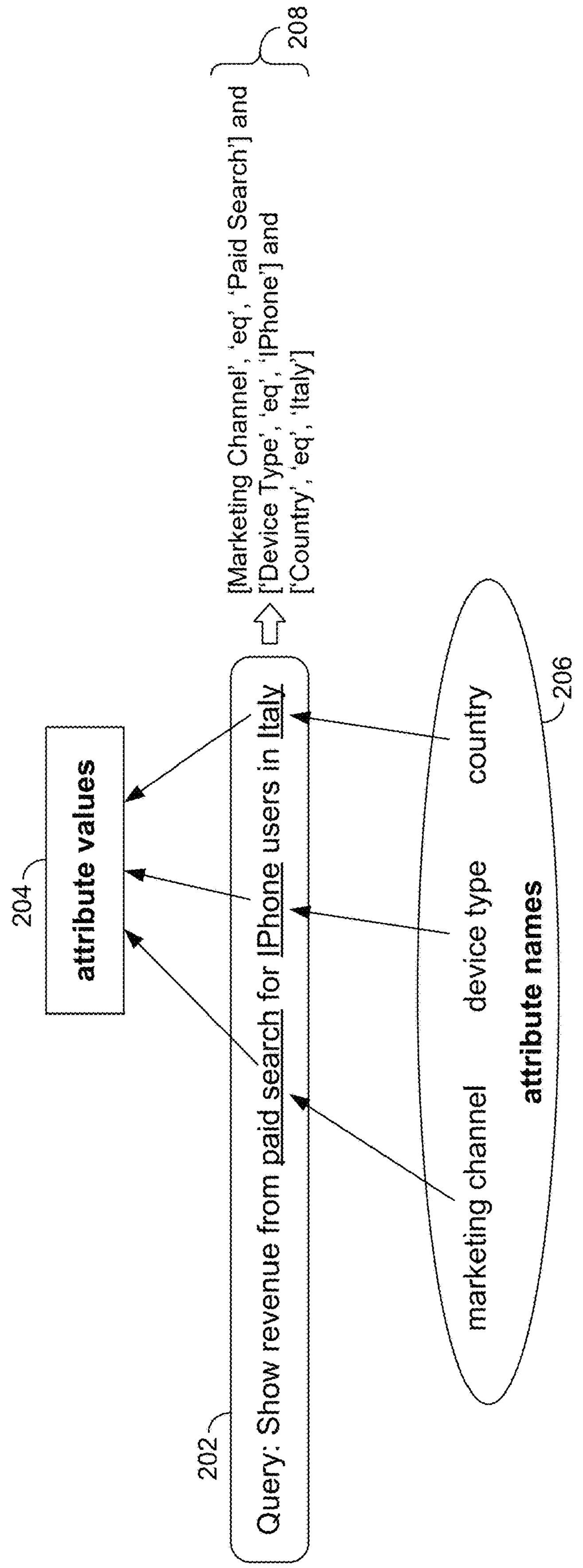
FIG. 2 is an example illustrating generation of initial filters from a natural language query in accordance with some implementations of the present disclosure.

The output from the generative model for a given natural language query can comprise no initial filters, a single initial filter, or multiple initial filters. The initial filters can correspond to non-numeric attributes and/or numeric attributes and processed accordingly. By way of example to illustrate a case with multiple initial filters, FIG. 2 shows a natural language query 202: "Show revenue from paid search for iPhone users in Italy." Based on this query 202, three initial filters 208 are output by the generative model. The initial filters 208 include initial attribute values 204 ("paid search", "iPhone", and "Italy") identified from the query 202 and initial attribute names 206 ("marketing channel", "device type", and "country") generated by the generative model. In cases like this in which multiple initial filters are generated, each initial filter is processed to generate a corresponding valid filter, as will be described in further detail below.

In some aspects, the initial filter component 112 generates a prompt based on the natural language query received from the user device (or at least a portion thereof) and provides the prompt to the generative model to generate the initial filter(s). The prompt can include text instructing the generative model regarding how to generate the text for the model output (e.g., do not include explanations, if query does not have a filter, then output an empty list to indicate this fact, convert abbreviated numerical information such as 1M, 1 million, to numerical data, etc.). In some instances, the prompt is generated to include additional information to help guide the generative model in generating the initial filter(s). For instance, the prompt could: employ a few-shot approach in which a set of example natural language queries paired with example filters is included; provide a list of valid attribute names found in the structured dataset; and/or include a single static example of a filter to illustrate the form of the output expected.

In some aspects, one or more query expansions operations can be performed for the natural language query. By way of example only and not limitation, synonym expansion could be performed to add synonyms for words/phrases in the query, and/or acronym expansion could be performed to add words/phrases for acronyms in the query. The query expansion operations can be performed by the generative model or separately.

The generative model used by the initial filter component 112 to generate initial filters for natural language queries can comprise a language model that includes a set of statistical or probabilistic functions to perform Natural Language Processing (NLP) in order to understand, learn, and/or generate human natural language content. For example, a language model can be a tool that determines the probability of a given sequence of words occurring in a sentence or natural language sequence. Simply put, it can be a model that is trained to predict the next word in a sentence. A language model is called a large language model (LLM) when it is trained on enormous amount of data and/or has a large number of parameters. Some examples of LLMs are GOOGLE's BERT and OpenAI's GPT-3 and GPT-4. These models have capabilities ranging from writing a simple essay to generating complex computer codes-all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write or otherwise in a form dictated, for instance, by a prompt.

In accordance with some aspects, the generative model used by the initial filter component 112 comprises a neural network. As used herein, a neural network comprises multiple operational layers, including an input layer and an output layer, as well as any number of hidden layers between the input layer and the output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, the generative model used by the initial filter component 112 is a pre-trained model (e.g., GPT-4) that has not been fined-tuned. In other configurations, the generative model is a model that is built and trained from scratch or a pre-trained model that has been fine-tuned. In such configurations, the generative model can be trained or fine-tuned using training data. For instance, the training data can comprise pairs of data in which each pair includes a natural language query and one or more initial filters that serve as ground truth output, and the generative model can be trained to generate output text that targets the ground truth output. During training, weights associated with each neuron can be updated. Originally, the generative model can comprise random weight values or pre-trained weight values that are adjusted during training. In one aspect, the generative model is trained using backpropagation. The backpropagation process comprises a forward pass, a loss function, a backward pass, and a weight update. This process is repeated using the training data. For instance, each iteration could include providing a natural language query from the training data to the generative model, generating a set of one or more initial filters by the generative model, comparing (e.g., computing a loss) the generated initial filter(s) output by the generative model with the ground truth filter(s) paired with the query in the training data, and updating the generative model based on the comparison. The goal is to update the weights of each neuron (or other model component) to cause the generative model to produce useful initial filters given natural language queries. Once trained, the weight associated with a given neuron can remain fixed. The other data passing between neurons can change in response to a given input. Retraining the network with additional training data can update one or more weights in one or more neurons.

The attribute resolving component 114 of the query processing system 104 processes each initial filter output by the filter component 112 to translate, as needed, the initial attribute name and/or the initial attribute value in the initial filter to a valid attribute name and/or a valid attribute value found in the structured dataset in the data store 110. In some aspects, the attribute resolving component 114 processes a given initial filter differently based on whether the initial filter corresponds with a non-numeric attribute or a numeric attribute.

In the case of an initial filter for a non-numeric attribute, the attribute resolving component 114 resolves both the initial attribute name and initial attribute value. For the initial attribute value, the attribute resolving component 114 performs one or more matching operations to identify a valid attribute value in the data corresponding to the initial attribute value from the initial filter.

In some aspects, the attribute resolving component 114 initially performs an exact matching operation to determine if the initial attribute value exactly matches a valid attribute value in the data. This could be performed, for instance, by using the initial attribute value to search an exact match data store that stores data for valid attribute values in the structured dataset. Given the initial attribute value, the exact match data store is searched to determine if there is valid attribute value that is an exact match. In some configurations, this is done using an exact reverse hash table that takes as input the initial attribute value and, if the there is an exact match for the initial attribute value, returns one or more valid attribute names for which the initial attribute value appears in the structured dataset. This approach is extremely fast, taking only O(1) constant time. For instance, suppose the query processing system 104 receives the query, "Compare revenue for US", and the filter generated is be ['Country', 'eq', 'US']. In this example, 'US' is an attribute value that exact matching determines is in the structured dataset. Then, using an exact reverse hash table, the valid attribute name for which the 'US' attribute value appears is identified as "variables/geocountry".

If there is no exact match between the initial attribute value and the valid attribute values present in the structured dataset, then the attribute resolving component 114 performs one or more further matching operations, such as fuzzy matching and/or similarity-based matching. Fuzzy matching allows for approximate matches between the initial attribute value and valid attribute values from the structured dataset by considering similarities between values based on various factors such as spelling mistakes, typos, phonetic similarity, etc.

Similarity-based matching involves identifying and quantifying the similarity between the initial attribute value and valid attribute values from the structure dataset based on certain attributes, features, or characteristics. The goal of the similarity-based matching used herein is to determine how closely related or alike the initial attribute value is to valid attribute values.

The attribute resolving component 114 performs similarity-based matching, in some configurations, by generating an embedding of the initial attribute value and comparing it against embeddings of valid attribute values from the structured dataset to find the closest match(es). More particularly, an embedding model is used to generate an embedding of each valid attribute value in the structured dataset, and the embeddings are stored in association with their corresponding valid attribute values in an embedding index, which can implemented, for instance, using Hierarchical Navigable Small Worlds (HNSW), inverted file index (IVF), Locality Sensitive Hashing (LSH), among other technologies.

Any of a variety of different embedding models could be employed to generate the embeddings of the valid attribute values. An embedding model comprises a machine learning model, such as a neural network, that transforms input data into a vector representation, referred to herein as an embedding, in an embedding space (sometimes referred to as a latent vector space). The embedding space of the embedding model provides a multi-dimensional space in which the similarity between embeddings can be determined, for instance, based on a geometric distance between embeddings in the embedding space. As such, an embedding generated by an embedding model for an initial attribute value comprises a vector representation for the initial attribute value in the embedding space of the embedding model, and an embedding for a valid attribute value generated by the embedding model comprises a vector representation for the valid attribute value in the embedding space of the embedding model. The embeddings generated by the embedding model allow for the similarity between an embedding for an initial attribute value and embeddings for valid attribute values to be determined. This could involve vector search techniques, such as cosine similarity and k-nearest neighbor, to determine similarity measures between the embedding for the initial attribute value and embeddings for the valid attribute values. Based on the similarity, an embedding for a valid attribute value can be determined, and the valid attribute value associated with that embedding returned.

After identifying a valid attribute value for the initial attribute value via fuzzy matching or similarity-based matching, the valid attribute value can then be used to identify one or more valid attribute names associated with the valid attribute value in the data. This can be performed, for instance, using a data store that maps valid attribute values to valid attribute names (e.g., the exact reverse hash table discussed above). For example, the exact reverse hash table can take as input the valid attribute value and return an indication of one or more valid attribute names associated with that valid attribute value.

As an example to illustrate similarity-based matching, suppose the above-discussed query is received, "Compare revenue for US", and the initial filter generated is ['Country', 'eq', 'US']. However, in this example, "US" is not a valid attribute value in the data; while "United States" is a valid attribute value. As such, exact matching fails for "US", and similarity-based matching is performed. An embedding is generated for "US" and similarity of that embedding to embeddings for valid attribute values identifies an embedding for the valid attribute value "United States". Then, using the exact reverse hash table, the valid attribute name for which the 'United States' attribute value appears is identified as "variables/geocountry".

While the configurations discussed above use only the initial attribute value to determine the valid attribute value, in other aspects, the initial attribute name from the initial filter can also be used for resolving the attribute value. The following provides a few examples of how the initial attribute value can be used, but other approaches could be employed. One approach is to use the initial attribute name when generating an embedding for the initial attribute value for similarity-based matching. For instance, the initial attribute name could be added to the initial attribute value and an embedding of this combination could be derived, or separate embeddings of each could be derived independently and combined. In such aspects, the embeddings for valid attribute values stored in the embedding index could be generated in the same manner.

As another approach, the initial attribute name could be used to determine a confidence in a valid attribute value identified from similarity-based matching using an embedding for the initial attribute value. For instance, after identifying the valid attribute value and determining a valid attribute name corresponding with that valid attribute value, the initial attribute name could be compared against that valid attribute name, for instance, using a similarity-based approach comparing embeddings of the two. In some cases, when similarity measures are generated between an initial attribute value and a number of embeddings for valid attribute values, those similarity scores can be further supplemented with similarity measures between the initial attribute name and a valid attribute name corresponding with each valid attribute value in order to select a particular valid attribute value. In still further aspects, metadata and other information associated with attributes (e.g., attribute descriptions) could be employed.

As noted above, the attribute resolving component 114 can determine the valid attribute name for an initial filter in some cases based on the valid attribute value alone (i.e., independent of the initial attribute name). In particular, when the valid attribute value corresponds to a single valid attribute name in the structured dataset, that valid attribute name is used. In other instances, the attribute resolving component 114 performs one or more matching operations using the initial attribute name to identify the valid attribute name. This could include exact matching, fuzzy matching, and/or similarity-based matching (similar to the discussion above for the initial attribute value) in which a valid attribute name that exactly matches or is most similar to the initial attribute name is identified. For example, suppose a valid attribute value corresponds to multiple valid attribute names. In that case, the attribute resolving component 114 could compare the initial attribute name to each of the valid attribute names and select an exact match, if present, or a valid attribute name that is the most similar to the initial attribute name if no exact match is present.

In the case of a filter for a numeric attribute, the attribute resolving component 114 resolves just the attribute name. The attribute resolving component 114 can identify a valid attribute name for an initial filter name in the case of a numeric attribute by performing one or more matching operations. In some aspects, the attribute resolving component first performs exact matching to determine if there is a valid attribute name that exactly matches the initial attribute name. If there is no exact match, fuzzy matching and/or similarity-based matching can be performed to identify a valid attribute name that is most similar to the initial attribute name. In some instances, the valid attribute name is identified using the initial attribute name only. In other instances, the valid attribute name is identified by also leveraging the initial attribute value. For instance, the initial attribute value could be used to determine a confidence in a valid attribute name by verifying that the initial attribute value is within a range of valid attribute values for the valid attribute name. This could help in selecting among multiple valid attribute names that are similar to the initial attribute value.

The valid filter component 116 generates valid filters based on valid attribute values and valid attribute names identified by the attribute resolving component 114. In the case of a non-numeric attribute, the valid filter component 116 generates the valid filter using the valid attribute value identified for the initial attribute value in the initial filter and the valid attribute name identified for the initial attribute name in the initial filter. In some aspects, the valid filter component 116 generates the valid filter by replacing the initial attribute value with the valid attribute value and/or replacing the initial attribute name with the valid attribute name. In the case of an exact match for either or both, there may be no need to replace the initial attribute value and/or the initial attribute name.

In the case of a numeric attribute, the valid filter component 116 generates the valid filter using the initial attribute value in the initial filter and the valid attribute name identified for the initial attribute name in the initial filter. In some aspects, the valid filter component 116 generates the valid filter by replacing the initial attribute name with the valid attribute name. In the case of an exact match, there may be no need to replace the initial attribute name.

Figure 3:
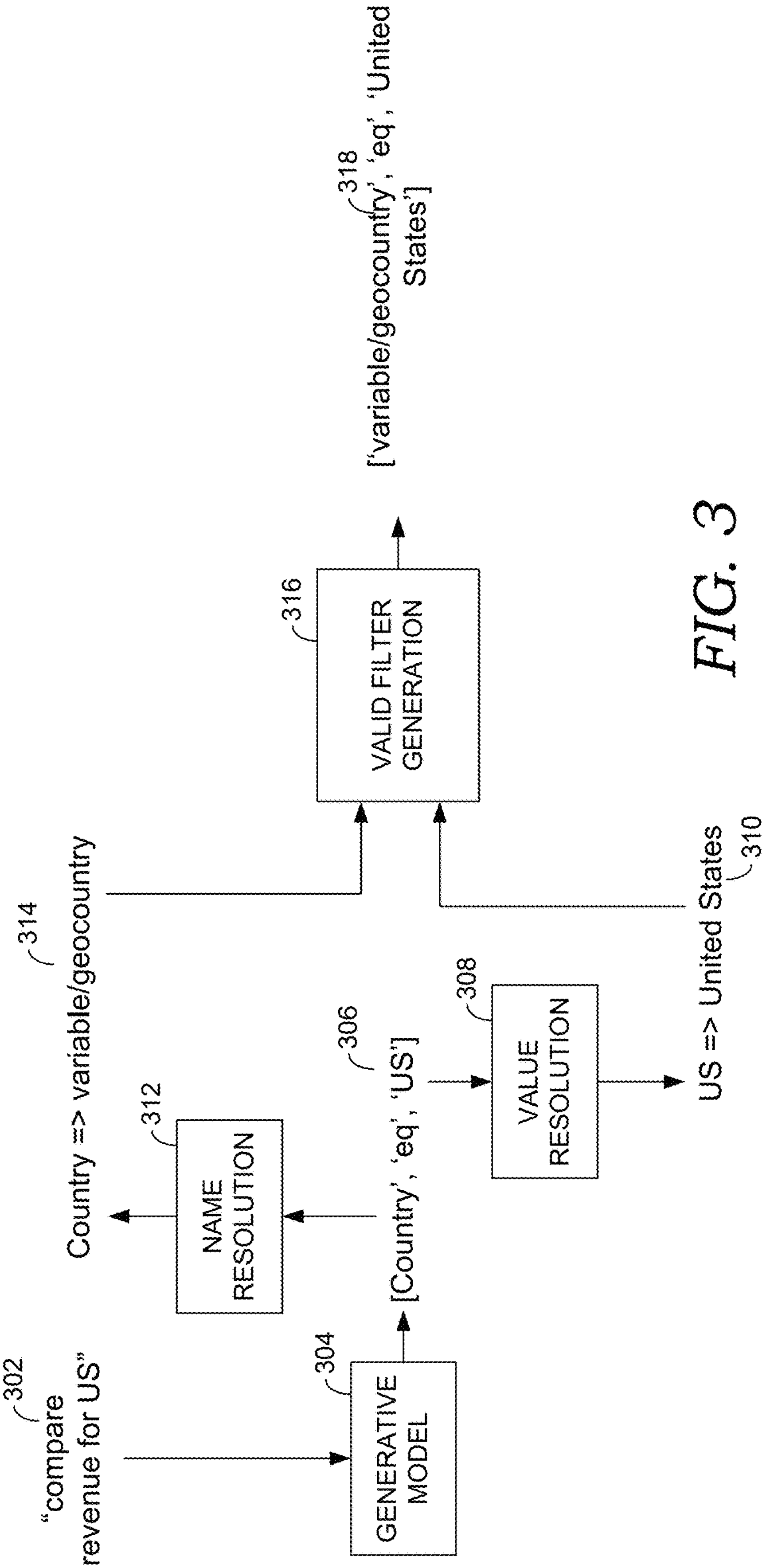
FIG. 3 is an example illustrating generation of an initial filter and resolving an attribute name and attribute value to generate a valid filter in accordance with some implementations of the present disclosure.

FIG. 3 provides an example illustrating generation of an initial filter from a natural language query and resolving an attribute name and attribute value to provide a valid filter. As shown in FIG. 3, a natural language query 302 is received: "compare revenue for US". An input is provided to a generative model 304 based on the query 302. As noted above, this could include generating a prompt based on the query 302 and providing the prompt as input to the generative model 304. Given the input, the generative model 304 outputs an initial filter 306, ['country', 'eq', 'US']. In this example, the initial filter 306 includes an initial attribute value "country", an operator "eq" (i.e., equals), and an initial attribute value "US".

Attribute value resolution 308 is performed to provide a translation 310 of the initial attribute value "US" to a valid attribute value "United States". Additionally, attribute name resolution 312 is performed to provide a translation 312 of the initial attribute name "country" to a valid attribute name "variable/geocountry". The attribute value resolution 308 and the attribute name resolution 310 could be performed, for instance, using an approach described above with reference to the attribute resolving component 114 of FIG. 1.

Given the translations 310 and 314, valid filter generation 316 is performed to generate a valid filter 318, ['variable/geocountry', 'eq', 'United States']. In this example, the valid filter has been generated by replacing the initial attribute name with the valid attribute name and the initial attribute value with the valid attribute value.

With reference again to FIG. 1, the data retrieval component 118 of the query processing system 104 executes queries (i.e., structured queries) against the data store 110 to access data for formulating responses to natural language queries from user devices, such as the user device 102. The queries executed by the data retrieval component 118 can be structured in an appropriate syntax (e.g., a SQL query) and employ any valid filters provided by the valid filter component 116.

The query processing system 104 further includes a user interface component 120 that provides one or more user interfaces for interacting with the query processing system 104. The user interface component 120 provides one or more user interfaces to a user device, such as the user device 102. In some instances, the user interfaces can be presented on the user device 102 via the application 108, which can be a web browser or a dedicated application for interacting with the query processing system 104. For instance, the user interface component 120 can provide user interfaces for, among other things, receiving natural language queries input by the user and providing responses to the natural language queries.

Example Methods for Generating Data Filters from Natural Language Queries

Figure 4:
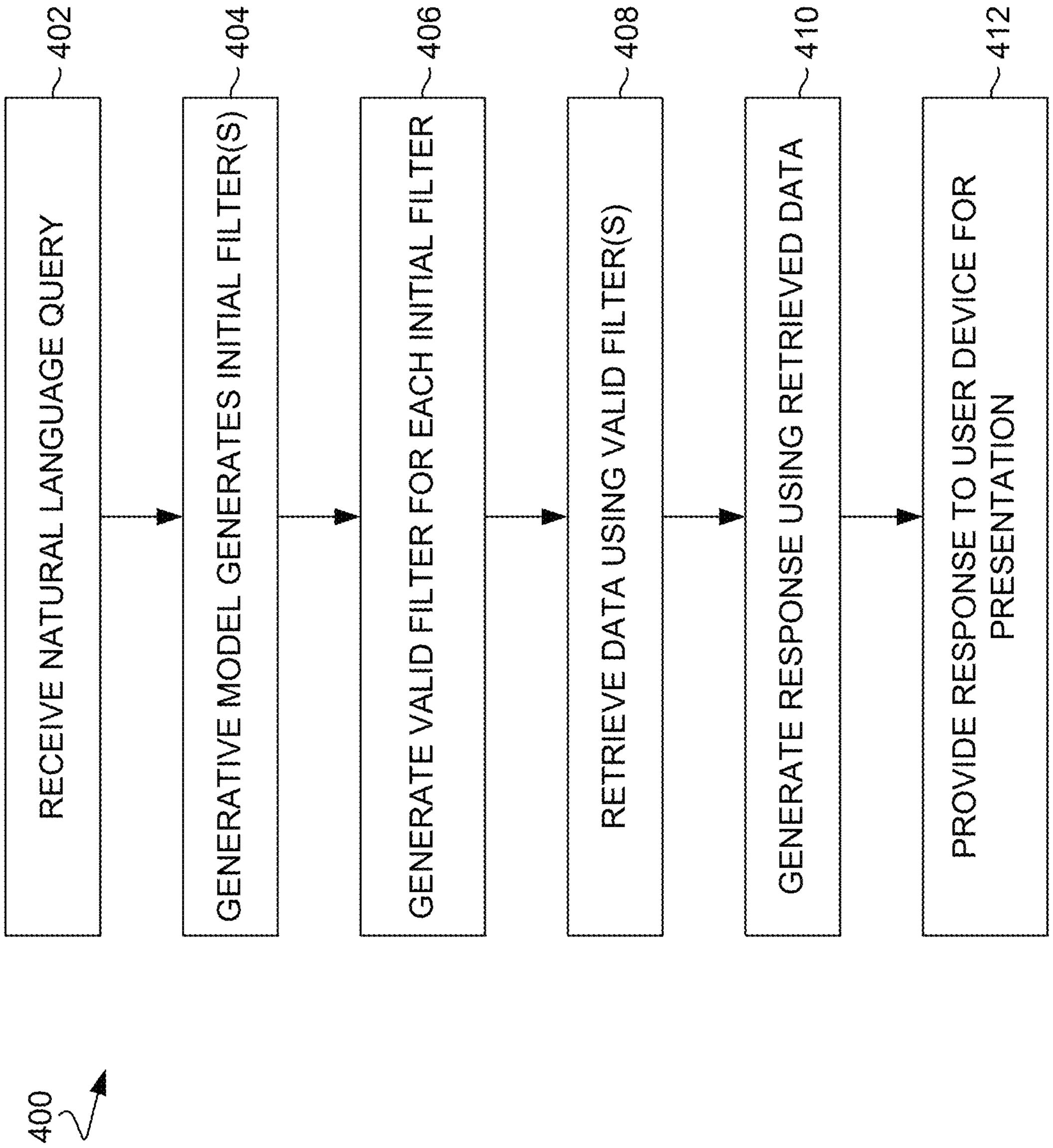
FIG. 4 is a flow diagram showing a method for processing a natural language query in accordance with some implementations of the present disclosure.

With reference now to FIG. 4, a flow diagram is provided that illustrates a method 400 for processing a natural language query. The method 400 may be performed, for instance, by the query processing system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a natural language query is received from a user device, such as the user device 102 of FIG. 1. One or more initial filters are determined for the natural language query, as shown at block 404. In particular, an input based on the natural language query is provided to a generative model, which outputs the initial filter(s). Each initial filter can include an initial attribute name and an initial attribute value.

A valid filter is generated for each initial filter, as shown at block 406. This can include resolving the initial attribute name and the initial attribute value in the case of a non-numeric attribute (e.g., using the method 500 described below with reference to FIG. 5) or resolving the initial attribute name in the case of a numeric attribute (e.g., using the method 600 describe below with reference to FIG. 6).

As shown at block 408, data is retrieved from a data store (e.g., the data store 110 of FIG. 1) using the valid filter(s). For instance, a query in an appropriate syntax (e.g., a SQL query) could be generated with the valid filters and data could be retrieved from the data store using that query. A response is generated using the retrieved data at block 410, and the response is provided to the user device for presentation at block 412.

Figure 5:
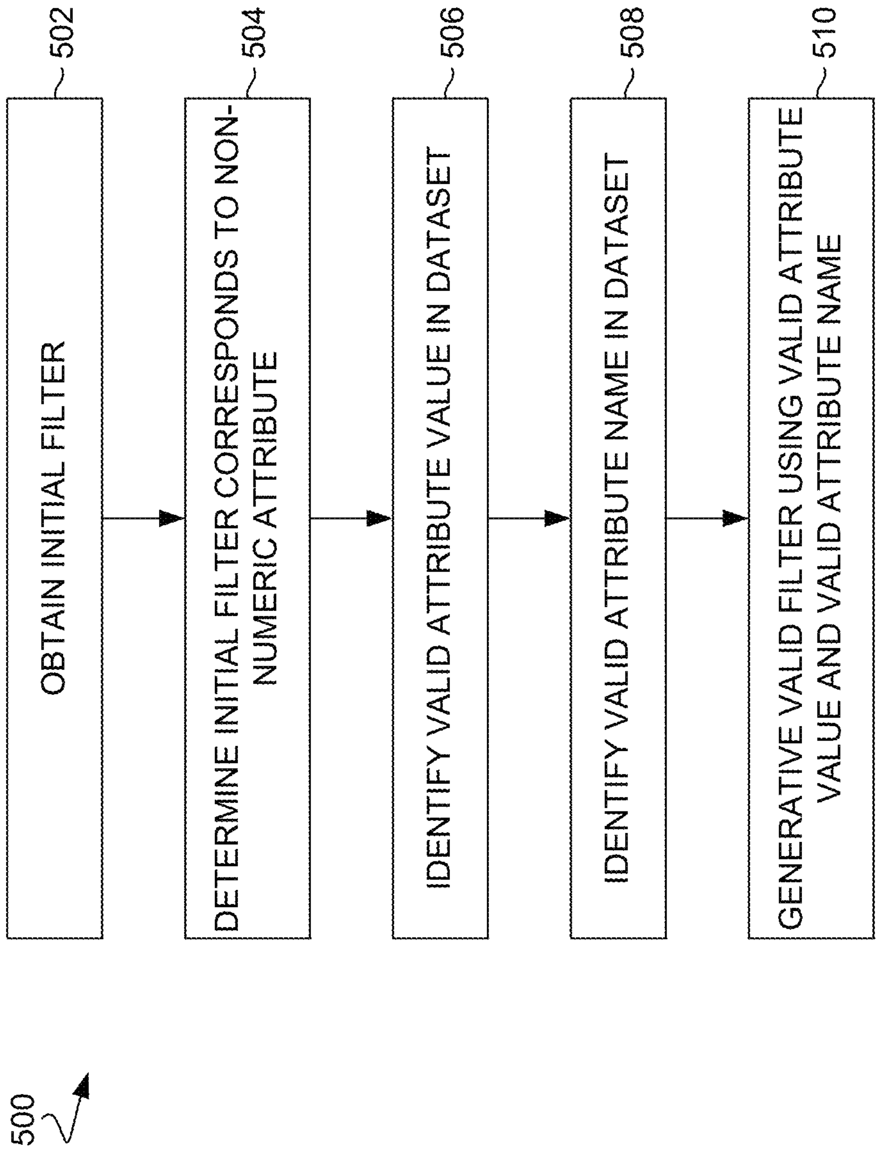
FIG. 5 is a flow diagram showing a method for generating a valid filter for a non-numeric attribute in accordance with some implementations of the present disclosure.

Turning next to FIG. 5, a flow diagram is provided showing a method 500 for generating a valid filter for a non-numeric attribute. The method 500 could be performed, for instance, by the query processing system 104 of FIG. 1. As shown at block 502, an initial filter is provided for a natural language query (e.g., via blocks 402 and 404 of FIG. 4). The initial filter includes an initial attribute value and an initial attribute name. The initial filter may the only filter generated for the natural language query or one of several initial filters.

The initial filter is determined to correspond to a non-numeric attribute, as shown at block 504, for instance, based on the initial attribute value being a non-numerical value. Based on determining the initial filter is for a non-numeric attribute, a valid attribute value in the dataset is identified for the initial attribute value in the initial filter at block 506, and a valid attribute name in the dataset is identified for the initial attribute value in the initial filter at block 508.

In some aspects, the valid attribute value is identified by first performing exact matching and then performing fuzzy matching and/or similarity-based matching in the event of no exact match. As discussed above, similarity-based matching can be based on the initial attribute value alone or by also leveraging the initial attribute name.

In some aspects, the valid attribute name is identified based on the valid attribute value alone—e.g., in instances in which the valid attribute value corresponds to only a single valid attribute name. For instance, an exact reverse hash table or other data structure could be used to identify a valid attribute name associated with the valid attribute value. In other aspects, exact matching and/or similarity-based matching can be employed to identify the valid attribute name. For instance, in cases in which the identified attribute value corresponds to multiple valid attribute names, a similarity between the initial attribute name and each of those valid attribute names (e.g., similarity based on embeddings of each) could be used to select the valid attribute name that is most similar to the initial attribute name.

As shown at block 510, a valid filter is generated using the valid attribute value identified at block 506 and the valid attribute name identified at block 508. In some aspects, the valid filter can be generated by replacing the initial attribute value in the initial filter with the valid attribute value (e.g., when the values differ) and/or replacing the initial attribute name in the initial filter with the valid attribute name (e.g., when the names differ).

Figure 6:
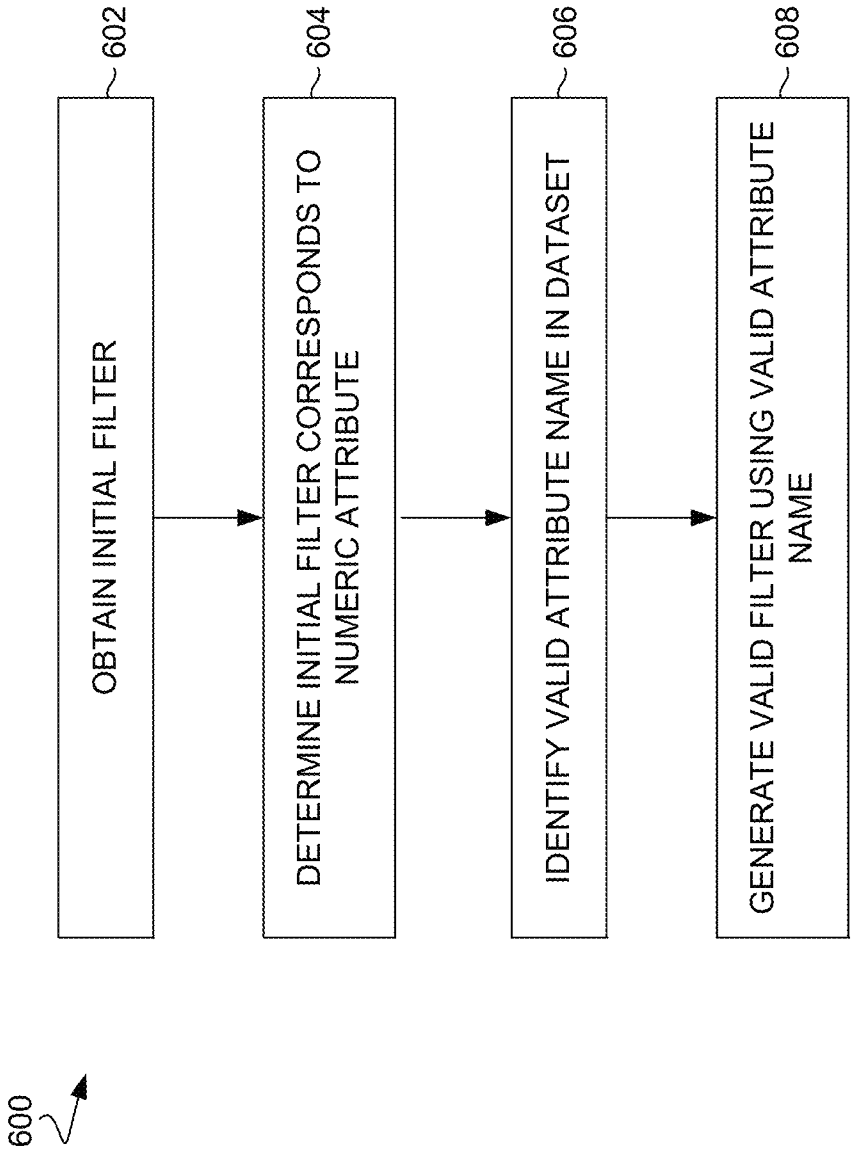
FIG. 6 is a flow diagram showing a method for generating a valid filter for a numeric attribute in accordance with some implementations of the present disclosure.

FIG. 6 is a flow diagram showing a method 600 for generating a valid filter for a numeric attribute. The method 600 could be performed, for instance, by the query processing system 104 of FIG. 1. As shown at block 602, an initial filter is provided for a natural language query (e.g., via blocks 402 and 404 of FIG. 4). The initial filter includes an initial attribute value and an initial attribute name. The initial filter may the only filter generated for the natural language query or one of several initial filters.

The initial filter is determined to correspond to a numeric attribute, as shown at block 604, for instance, based on the initial attribute value being a numerical value. Based on determining the initial filter is for a numeric attribute, a valid attribute name in the dataset is identified for the initial attribute value in the initial filter at block 606.

In some aspects, the valid attribute name is identified by first performing exact matching and then performing fuzzy matching and/or similarity-based matching in the event of no exact match. The valid attribute name can be identified using the initial attribute name only or by also leveraging the initial attribute value. For instance, the initial attribute value could be used to determine a confidence in a valid attribute name by verifying that the initial attribute value is within a range of valid attribute values for the valid attribute name.

As shown at block 608, a valid filter is generated using the initial attribute value and the valid attribute name identified at block 606. In some aspects, the valid filter can be generated by replacing the initial attribute name in the initial filter with the valid attribute name (e.g., when the names differ).

Exemplary Operating Environment

Figure 7:
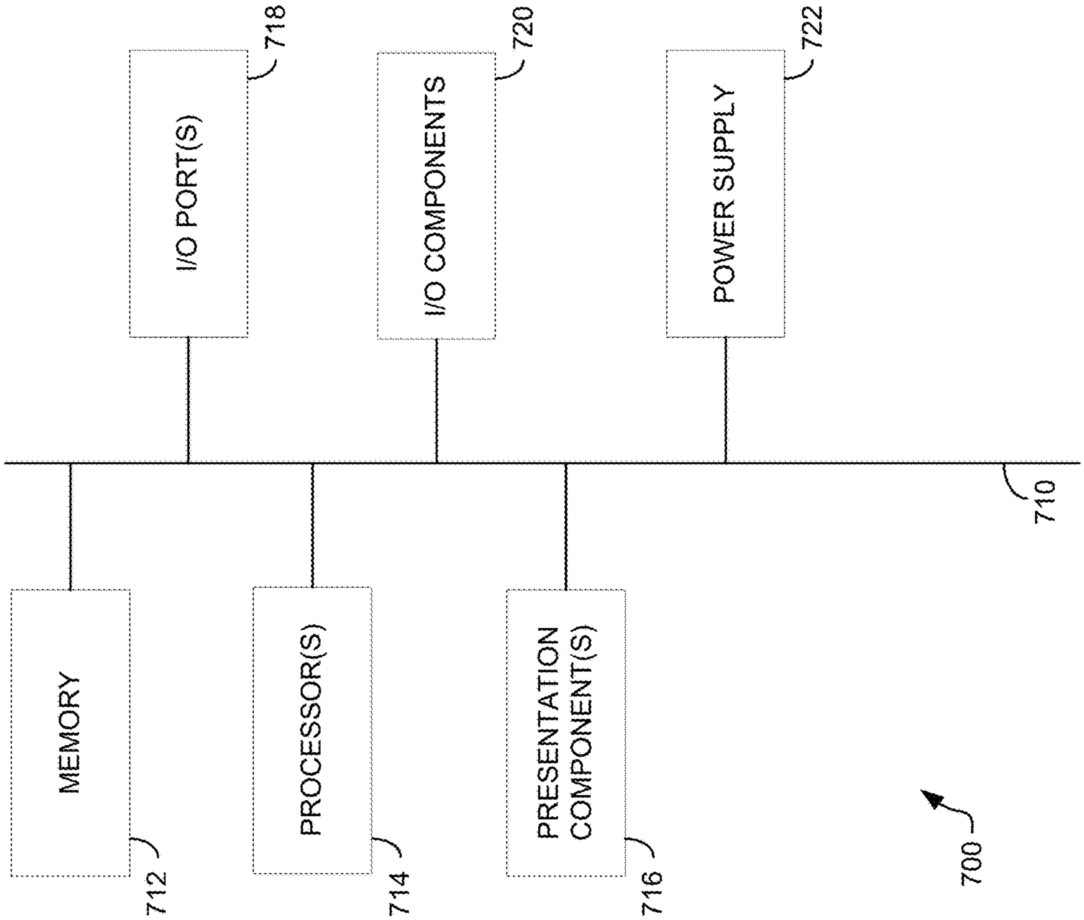
FIG. 7 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 7 in particular, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

For purposes of this disclosure, the word “including” has the same broad meaning as the word “comprising,” and the word “accessing” comprises “receiving,” “referencing,” or “retrieving.” Further, the word “communicating” has the same broad meaning as the word “receiving,” or “transmitting” facilitated by software or hardware-based buses, receivers, or transmitters using communication media described herein. In addition, words such as “a” and “an,” unless otherwise indicated to the contrary, include the plural as well as the singular. Thus, for example, the constraint of “a feature” is satisfied where one or more features are present. Also, the term “or” includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term “configured for” can refer to “programmed to” perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:

receiving, by at least one server of one or more servers of a query processing system, a natural language query for querying a structured dataset;

generating, by a generative model, an initial filter based on the natural language query, the initial filter including an initial attribute name and an initial attribute value with an operator associating the initial attribute name and the initial attribute value, wherein the initial filter is noisy because the initial attribute name does not exactly match any valid attribute name in a structured dataset and/or the initial attribute value does not exactly match any valid attribute value in the structured dataset;

identifying, by at least one server of the one or more servers, a valid attribute value corresponding to the initial attribute value from a plurality of valid attribute values in the structured dataset;

identifying, by at least one server of the one or more servers, a valid attribute name corresponding to the initial attribute name from a plurality of valid attribute names in the structured dataset;

generating, by at least one server of the one or more servers, a valid filter from the initial filter by replacing the initial attribute value in the initial filter with the valid attribute value and/or replacing the initial attribute name in the initial filter with the valid attribute name;

retrieving, by at least one server of the one or more servers, data from the structured dataset using the valid filter; and generating an output using the retrieved data.

2. The one or more computer storage media of claim 1, wherein the operations further comprise:

generating a prompt using the natural language query, the prompt including one or more selected from the following: a set of example natural language queries paired with example filters, a list of valid attribute names presented in the structured dataset, and an example filter; and providing the prompt to the generative model.

3. The one or more computer storage media of claim 1, wherein the valid attribute value is identified for the initial attribute value in response to determining the initial filter corresponds to a non-numeric attribute.

4. The one or more computer storage media of claim 1, wherein identifying the valid attribute value corresponding to the initial attribute value comprises:

searching an exact match data store storing data for a plurality of valid attribute values in the structured dataset.

5. The one or more computer storage media of claim 4, wherein identifying the valid attribute value corresponding to the initial attribute value comprises:

in response to determining an exact match is not found in the exact match data store, performing a similarity-based search by:

generating an embedding of a combination of the initial attribute name and the initial attribute value; and determining a similarity between the embedding of the combination and embeddings for each at least a portion of the plurality of valid attribute values, each embedding for the at least a portion of the plurality of valid attribute values being generated based on a corresponding combination of a valid attribute name and a valid attribute value.

6. The one or more computer storage media of claim 4, wherein the exact match data store is an exact reverse hash table that returns the valid attribute name in response to identifying the valid attribute value as an exact match to the initial attribute value.

7. The one or more computer storage media of claim 1, wherein identifying the valid attribute name corresponding to the initial attribute name comprises:

after identifying the valid attribute value, determining the valid attribute value corresponds to the valid attribute name.

8. The one or more computer storage media of claim 1, wherein identifying the valid attribute name corresponding to the initial attribute name comprises:

searching an exact match data store storing data for a plurality of valid attribute names in the structured dataset.

9. The one or more computer storage media of claim 1, wherein identifying the valid attribute name corresponding to the initial attribute name comprises:

generating an embedding of the initial attribute name; and determining a similarity between the embedding of the initial attribute name and an embedding for each at least a portion of a plurality of valid attribute names in the structured dataset.

10. The one or more computer storage media of claim 1, wherein generating the valid filter comprises:

replacing the initial attribute name in the initial filter with the valid attribute name; and replacing the initial attribute value in the initial filter with the valid attribute value.

11. The one or more computer storage media of claim 1, wherein the generative model generates a second initial filter having a second initial attribute value and a second initial attribute name, and wherein the operations further comprise:

determining the second initial filter corresponds to a numeric attribute;

identifying, in the structured dataset, a second valid attribute name corresponding to the second initial attribute name; and generating a second valid filter using the initial attribute value and the valid attribute name, wherein the data is retrieved from the structured dataset using the valid filter and the second valid filter.

12. A computer-implemented method comprising:

receiving, via a user interface component of at least one server of one or more servers of a query processing system, a natural language query from a user device;

generating, by a generative model, an initial filter based on the natural language query, the initial filter comprising an initial attribute value and an initial attribute name with an operator associating the initial attribute name and the initial attribute value, wherein the initial filter is noisy because the initial attribute name does not exactly match any valid attribute name in a structured dataset and/or the initial attribute value does not exactly match any valid attribute value in the structured dataset;

determining, by an attribute resolving component of at least one server of the one or more servers, that the initial filter corresponds to a non-numeric attribute;

identifying, by the attribute resolving component, a valid attribute value corresponding to the initial attribute value by:

searching an exact match data store storing data for a plurality of valid attribute values in the structured dataset, when an exact match for the initial attribute value is found from the exact match data store, identifying the initial attribute value as the valid attribute value, and when an exact match for the initial attribute value is not found from the exact match data store, performing a similarity-based matching operation to identify the valid attribute value based on similarity to the initial attribute value;

identifying, by the attribute resolving component, a valid attribute name corresponding to the initial attribute name;

generating, by a valid filter component of at least one server of the one or more servers, a valid filter from the initial filter by replacing the initial attribute value in the initial filter with the valid attribute value and/or replacing the initial attribute name in the initial filter with the valid attribute name;

querying, by a data retrieval component of at least one server of the one or more servers, a data store storing the structured dataset using the valid filter to access data; and providing, by the user interface component, a response to the natural language query that contains the accessed data.

13. The computer-implemented method of claim 12, wherein generating the initial filter comprises:

generating a prompt using the natural language query, the prompt including:

(1) a set of example natural language queries paired with example filters, and/or (2) a list of valid attribute names present in the structured dataset; and providing the prompt to the generative model.

14. The computer-implemented method of claim 12, wherein the similarity-based matching operation comprises:

generating an embedding of the initial attribute value; and determining a similarity between the embedding of the initial attribute value and an embedding for each at least a portion of the plurality of valid attribute values.

15. The computer-implemented method of claim 12, wherein identifying the valid attribute name corresponding to the initial attribute name comprises determining the valid attribute value corresponds to the valid attribute name.

16. The computer-implemented method of claim 12, wherein identifying the valid attribute name corresponding to the initial attribute name comprises:

generating an embedding of the initial attribute name; and determining a similarity between the embedding of the initial attribute name and an embedding for each at least a portion of a plurality of valid attribute names in the structured dataset.

17. A computer system comprising:

one or more processors; and one or more computer storage media storing computer-useable instructions that, when used by the one or more processors, causes the computer system to perform operations comprising:

receiving, by a user interface component of at least one server of one or more servers of a query processing system, a natural language query;

generating, by a generative model, an initial filter based on the natural language query, the initial filter comprising an initial attribute value and an initial attribute name with an operator associating the initial attribute name and the initial attribute value, wherein the initial filter is noisy because the initial attribute name does not exactly match any valid attribute name in a structured dataset and/or the initial attribute value does not exactly match any valid attribute value in the structured dataset;

identifying, by an attribute resolving component of at least one server of the one or more servers, a valid attribute value corresponding to the initial attribute value and a valid attribute name corresponding to the initial attribute name;

generating, by a valid filter component of at least one server of the one or more servers, a valid filter by replacing the initial attribute value in the initial filter with the valid attribute value and replacing the initial attribute name in the initial filter with the valid attribute name;

retrieving, from the structured dataset, data using the valid filter; and providing, by the user interface component, a response to the natural language query using the retrieved data.

18. The computer system of claim 17, wherein the valid attribute value is identified by searching an exact reverse hash table using the initial attribute value to determine an exact match for the initial attribute value is present in the exact reverse hash table, and wherein the valid attribute name is returned by the exact reverse hash table based on the exact match.

19. The computer system of claim 18, wherein the exact reverse hash table also returns a second valid attribute name based on the exact match, and wherein the valid attribute name is identified as corresponding to the initial attribute name based on a similarity of the valid attribute name to the initial attribute name as compared to a similarity of the second valid attribute name to the initial attribute name.

20. The computer system of claim 17, wherein the valid attribute value is identified by searching an exact reverse hash table using the initial attribute value to determine an exact match is not present in the exact reverse hash table, and performing a similarity-based matching operation to identifying the valid attribute value based on similarity to the initial attribute value; and wherein the valid attribute name is identified by searching the exact reverse hash table using the valid attribute value.

* * * * *